Figure 1:
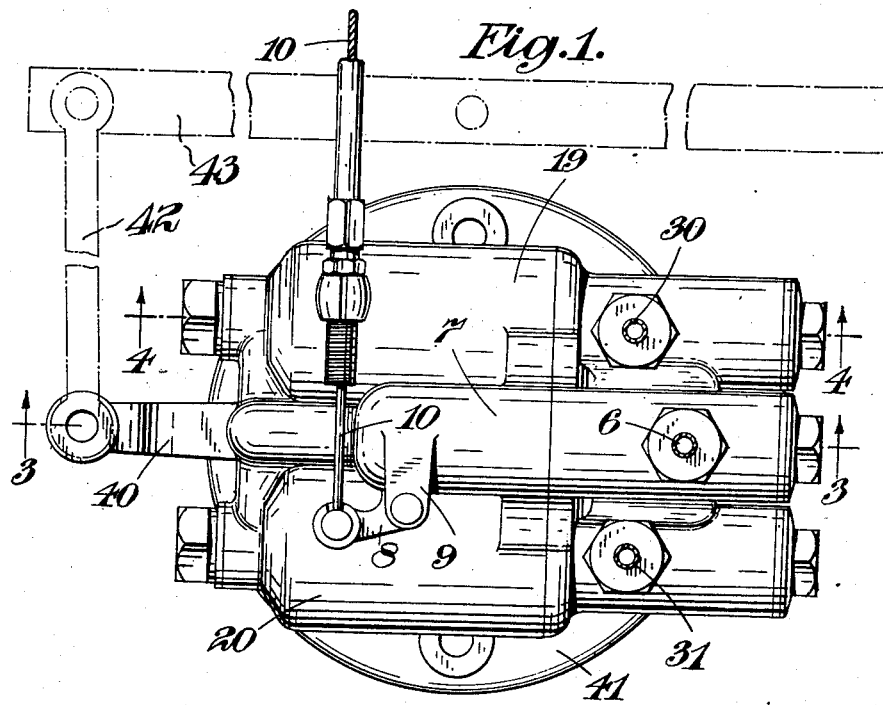

Jan. 3, 1939.　　　　F. J. TARRIS　　　　2,142,535
BRAKE FOR AIRCRAFT WHEELS
Filed Jan. 14, 1937　　　2 Sheets-Sheet 1

Inventor:
Frederick John Tarris.
By Stebbins, Blenko & Parmelee, Attys.

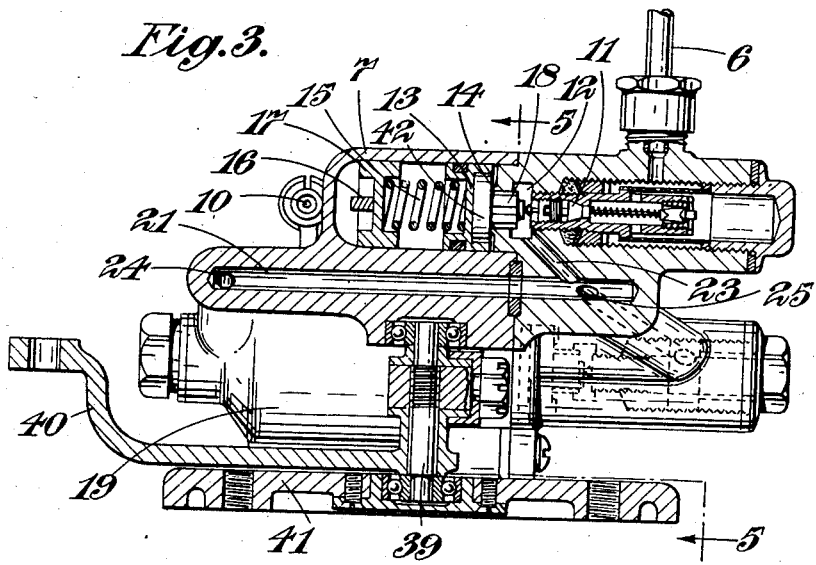
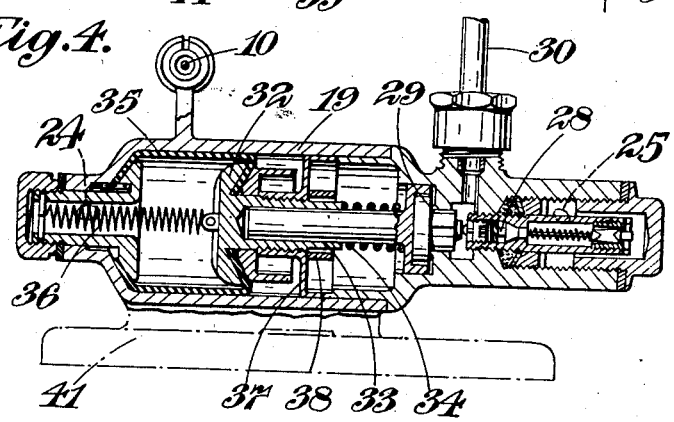
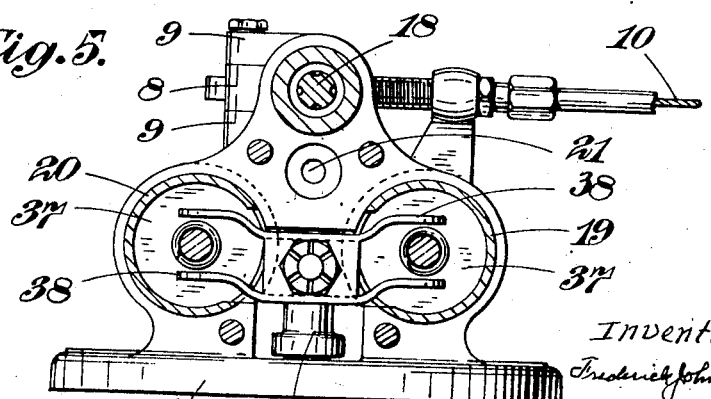

Patented Jan. 3, 1939

2,142,535

UNITED STATES PATENT OFFICE 2,142,535

BRAKE FOR AIRCRAFT WHEELS

Frederick John Tarris, London, England, assignor to The India Rubber, Gutta Percha and Telegraph Works Company Limited, Millbank, London, England, a British company Application January 14, 1937, Serial No. 120,561
In Great Britain January 23, 1936

8 Claims. (Cl. 188—152)

The present invention comprises improvements in or relating to brakes for aircraft wheels and provides a mechanism for controlling the operation of such brakes which are actuated by fluid pressure or by a vacuum.

The invention relates further to a control mechanism such that the brake pressure on the wheels or wheel sets of the under-carriage of an aircraft respectively situated on opposite sides of the central plane of symmetry extending vertically and longitudinally of the craft, can be differentially adjusted when it is desired to turn the aircraft whilst moving along the ground to one side or the other. A control mechanism operable in this way conveniently comprises a main control device which is operable by the aircraft pilot to control the simultaneous operation of the respective brake mechanisms for the wheels located on opposite sides of the central longitudinal plane of symmetry of the craft, and a pair of auxiliary control devices for effecting a differential adjustment of the respective brake mechanisms aforesaid, one of which auxiliary devices communicates with the brake or brakes of the wheel or wheels on one side of the said plane (referred to hereinafter as one set of brakes or as one brake-set) and the other of which auxiliary devices communicates with the brake or brakes of the wheel or wheels on the other side of the said plane. A mechanism of this form is to be understood by the phrase "a control mechanism of the type specified" employed hereinafter in the present specification.

In a control mechanism of the type specified, the auxiliary control devices are normally intended to be operated (e. g. for the purpose of steering when landing) by movement of the rudder-bar or equivalent mechanism of the aircraft and will conveniently then be so arranged that when the rudder-bar is turned, or its equivalent mechanism operated, to steer in one direction that auxiliary control device which serves to modify one set of brakes to aid the turning movement will be operated. Movement of the rudder-bar or equivalent mechanism to steer in the opposite direction will be arranged to operate the other auxiliary control device and produce an opposite differential braking effect. The term "rudder-bar" is employed hereinafter to refer to the rudder-bar of an aircraft or to any equivalent device or mechanism and is to be understood as including such equivalent mechanisms.

Various forms of control mechanism of the type specified have already been described in United States patent specifications Nos. 2,017,928 and 2,027,210 to which reference will be made hereinafter.

According to the present invention there is provided for the operation of aircraft wheel brakes actuated by fluid pressure, a control mechanism of the type described having a pair of auxiliary control devices each comprising means to release, either partially or wholly, the braking pressure in that brake-set to which the device is connected, a movable element to control the said brake releasing means and a plunger actuated upon directly by the actuating fluid, wherein the movable element and the plunger are directly interconnected to move simultaneously in the same directions for the purpose described. The purpose last referred to is that of providing a control mechanism of the type described which will have a small weight as compared with the weight of such mechanisms hitherto constructed, and it will be readily appreciated from the present specification that a relatively compact and light construction of each auxiliary control device and of the control mechanism as a whole is achieved by directly interconnecting the plunger and the movable element to move simultaneously in the same directions. The plunger normally serves to produce a disconnectable operative connection between the auxiliary control device and the rudder-bar of the aircraft, and movement transmitted by said operative connection to the plunger and movable element after the main control device has been operated to apply the brakes, will in all cases serve to effect a desired modification of the braking pressure in at least one brake set to produce the differential braking effect between the brake sets situated on opposite sides of the central longitudinal plane of symmetry of the craft.

A control mechanism constructed in accordance with the invention preferably has the brake releasing means located at one end of a substantially cylindrical container in which the movable element and the plunger are mounted for movement longitudinally of the axis of the cylinder. Preferably also, the movable element and the plunger are integrally formed, or are secured together to form an integral unit, and are provided with a surface for making free contact with and for moving under pressure from a bar which is operatively coupled to the rudder-bar.

In order that the invention may be more clearly understood, a preferred constructional example for use with aircraft wheel brakes actuated by means of compressed air will be described with reference to the accompanying drawings in which:—

Figure 2:
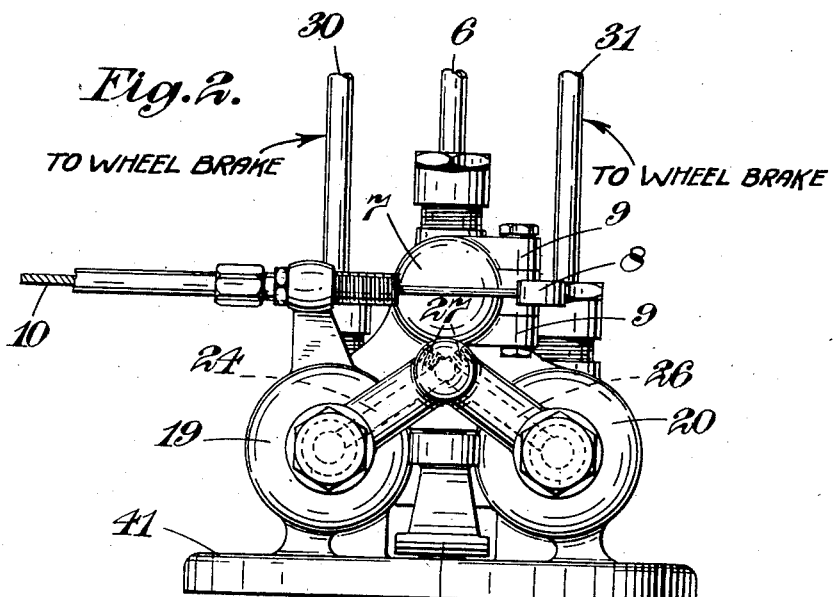

Figure 1 is a plan view of a control mechanism comprising main and auxiliary control devices, Figure 2 is an end elevation of the mechanism shown in Figure 1 as seen from the left-hand side of that figure, Figure 3 is a section on the line 3—3 of Figure 1, looking in the direction of the arrows, Figure 4 is a section on the line 4—4 of Figure 1, looking in the direction of the arrows, and Figure 5 is a section on the line 5—5 of Figure 3, looking in the direction of the arrows.

Like reference numerals are employed to denote like parts in the various figures of the drawings.

A compressed air reservoir (not shown in the drawings) is provided with a supply line leading from the reservoir to the connection 6 of the main control device 7 which carries a bell crank lever 8 pivotally mounted between lugs 9 and subject to the action of a cable 10 for the purpose of enabling a remote control of the operation of the main control device to be effected. The main control device, as seen more particularly from Figure 3, is constituted by a compound valve and associated parts of construction substantially similar to that of a main control device for use with a compressed air operated aircraft wheel brake mechanism described in the specification of United States Patent No. 2,027,210. The compound valve comprises an inlet valve 11 controlling the supply of compressed air from the connection 6 into the chamber 12 of the main control device. The compound valve of the main control device also comprises a release valve constituted by the piston head 13 which co-operates with the valve seating 14 and is loaded by the compressing spring 15 in accordance with the operation of the remote control device, a part 16 of the bell crank lever 8 operating against the element 17 slidably mounted in the main control device 7 for movement under the action of the part 16 to load the spring 15. A projection 18 carried by the piston head 13 serves to control the operation of the inlet valve 11 since the release valve member 13, when closed, is capable of additional movement under the loading of the spring 15 to open the inlet valve 11. This additional movement is possible for the reason that the valve seating 14 is arranged to bear against a resilient washer 42 of rubber sunk in the piston head 13.

As in the prior construction described in United States patent specification No. 2,027,210 the main control device 7 is mounted between a pair of auxiliary control devices 19 and 20 which are supplied with compressed air from the main control device. A single casting is formed to provide external cylindrical containers for the main control device and to provide also a distributing chamber 21, for pressure fluid passing from the main control device 7, located between the latter and the auxiliary control devices 19 and 20 which are supplied from the chamber 21. The passage 23 shown in Figure 3 enables compressed air passing through the inlet valve 11 of the main control device 7 to pass into the intermediate chamber 21, and conduits 24 and 25 at opposite ends of the chamber 21 lead to opposed ends of the auxiliary control device 19. Conduits similar to those shown at 24 and 25 connect the intermediate chamber 21 with the auxiliary control device 20, and one of these conduits is shown in chain lines at 26 in Figure 2. The conduits 24 and 26 are made by suitable drilling of the main casting referred to above, and conical screw-threaded plugs 27 are employed to close the ends of the drilled passages. The conduit 25 and the equivalent conduit for the auxiliary control device 20 are both drilled in a further casting which, together with that already referred to completes the external casing for the control mechanism.

The auxiliary control devices 19 and 20 are of similar construction and, as will be apparent from Figure 4, each comprises an external cylinder, such as 19, having at one end an inlet valve 28 and a release valve 29 similar to the compound inlet and release valve of the main control device. Opening of the valve 28 enables compressed air from the chamber 21 to pass through the conduit 25 and through the valve 28 to the conduit 30 or 31 leading to the brakes located on one or the other side of the aircraft. The release valve 29 is controlled by the operation of the plunger element 32 formed integrally with a movable element 33 serving to control the loading of a spring 34 by means of which the release valve 29 is closed. Between the head of the plunger element 32 and that end of the external cylinder remote from the compound valve there is afforded a chamber of variable volume which is also in communication with the distribution chamber 21 by means of the conduits 24 or 26. The chamber of variable volume conveniently has side walls formed by a rubber sleeve 35 secured between the piston head 32 and one end of the external cylinder, and is thus of substantially similar construction to the corresponding enclosed chambers of the auxiliary control devices of the mechanism described in specification No. 2,027,210. A tension spring 36 is also secured between the piston element 32 and the end of the external cylinder for the purpose of ensuring a return of the piston element 32 to its normal inoperative position when the brakes are to be released. In this position the chamber of variable volume is of minimum dimensions and the loading in the spring 36 on the release valve 29 is substantially zero in order to ensure that the release valve 29 is normally open and braking pressure completely released.

On operation of the main control device by the cable 10, compressed air will pass from the compressed air reservoir through the inlet valve 11 of the main control device to the intermediate chamber 21. From the latter chamber compressed air will pass through the conduits 24 and 26 to the chamber of variable volume enclosed by the rubber sleeve 35 in each auxiliary device, thereby moving the plunger 32 and the movable element 33 against the action of the tension spring 34 to shut and load the release valve 29 of each auxiliary control device. Slight additional movement of the valve member 29 takes place after the release valve is shut to open the inlet valve 28 permitting compressed air to pass through the conduit 25 leading from the intermediate chamber 21 to the conduit 30 passing to the brakes. Pressure in the latter builds up until it is sufficient to balance the loading of the spring 34 of each auxiliary device and cause the member 29 to move slightly, whilst itself remaining closed, to an extent permitting the supply valve 28 to close. An operative condition of the auxiliary control device with compressed air in the space enclosed by the sleeve 35 and with the spring 34 compressed to render the brakes operative is represented by the position of the parts shown in Figure 4.

The movable element 33 and plunger 32 of each auxiliary control device, when subject to the action of compressed air within the chamber enclosed by the rubber sleeve 35, move to a position at which contact takes place between the face of a part 37 secured to the movable piston and element and a bar 38 operatively connected to the rudder-bar or equivalent mechanism of the aircraft. As will be seen more clearly from Figure 5, the bar 38 has bifurcated ends extending in opposite directions from a central pivot 39 so that the said ends respectively engage with the surfaces of the parts 37 provided in the two auxiliary control devices. The walls of the latter are suitably cut away to permit passage therethrough of the arm 38 and permit also movement of the arm 38 about its pivot 39 under the action of the rudder-bar of the craft which is operatively connected to the extension 40 forming part of an element affording the arm 38, for example, by means of a link 42 extending between the extension 40 and the rudder bar 43. The pivotal mounting for the arm 38 is provided between opposed parts of the main casting affording the outer casing for the main and auxiliary control devices, said opposed parts comprising the lower part of the distribution chamber 21, and a base 41 by means of which the control device is mounted in the aircraft. It will be seen that the extension 40 and the arm 38 form in effect a T-shaped lever which when rocked by the connection of the extension 40 with the rudder-bar of the craft causes the ends of the arm 38 to move in opposite directions. Differential braking of the aircraft is accordingly effected by movement of the rudder-bar which will alter the position of the plunger and movable element in one or other of the auxiliary control devices in such a manner (i. e. to the left of Figure 4) as to release somewhat the loading of the spring 34 controlling the operation of the release valve 29 and through this release valve the braking pressure in the brake sets to which the auxiliary control device is connected. Air released through the valve 29 passes to atmosphere through the slots in the cylinder walls 19 through which pass the arms 38.

I claim:—

1. For the operation of aircraft wheel brakes actuated by fluid pressure, a control mechanism comprising a main control device to control the simultaneous operation of the wheel brakes of the craft, and a pair of auxiliary control devices respectively connected to serve brakes operative on wheels situated on opposite sides of the fore and aft center line of the craft, whereof each auxiliary control device comprises means to release the braking pressure in the brakes to which the device is connected, a movable element in alignment with and controlling said brake releasing means, and a plunger which is separate from and additional to the brake releasing means and is acted upon directly by the actuating fluid from the main control device and which plunger is mounted together with the movable element for simultaneous movement as an integral unit.

2. The combination according to claim 1 wherein each auxiliary control device comprises a substantially cylindrical container in which the brake releasing means are located at one end and in which the movable element and the plunger are mounted for movement longitudinally of the axis of the container.

3. The combination according to claim 1 having a member to afford an operative coupling with the steering gear for the craft, and having the movable element and the plunger of each auxiliary control device in the form of an integral unit which is also such as to afford a surface for making free contact with and for moving under pressure from the aforesaid member.

4. The combination according to claim 1 wherein each auxiliary control device comprises a substantially cylindrical container in which the brake releasing means are located at one end and in which the movable element and the plunger are mounted for movement longitudinally of the axis of the container, and wherein the auxiliary control devices are located side by side adjacent a distributing chamber to which pressure fluid conduits pass from the main control device and from which pressure fluid conduits pass to the ends of the auxiliary control devices.

5. The combination according to claim 1 having a pivotally mounted T shaped lever, contact surfaces on the extremities of the short lever arms, and means to afford an operative connection between the free end of the lever and the steering gear for the craft, and having the movable element and the plunger of each auxiliary control device in the form of an integral unit which is also such as to afford a surface for making free contact with and for moving under pressure from one of the aforesaid cam surfaces.

6. For the operation of aircraft wheel brakes actuated by compressed air, the combination according to claim 1 comprising for each auxiliary control device a brake releasing valve, a resilient connection interposed between said valve and the movable element, and a fluid connection to convey compressed air from the main control device to the auxiliary control device to act directly upon the plunger and load the said resilient connection and brake releasing valve in accordance with the extent of operation of the main control device.

7. For the operation of aircraft wheel brakes actuated by compressed air, the combination according to claim 1 comprising for each auxiliary control device a brake releasing valve, a resilient connection interposed between said valve and the movable element, a fluid connection to convey compressed air from the main control device to the auxiliary control device to act directly upon the plunger and load the said resilient connection and brake releasing valve in accordance with the extent of operation of the main control device, a further fluid connection to convey compressed air from the main control device to the connection subject to the action of the brake releasing valve, an admission valve controlling said further fluid connection and located adjacent said brake releasing valve, a resilient seating element for the last mentioned valve permitting a further slight movement of its co-operating valve member after the valve has been closed, and an extension on said co-operating valve member to open said admission valve by the aforesaid further slight movement.

8. A control mechanism according to claim 1 comprising means to afford an operative connection between the auxiliary control devices and the rudder bar of the aircraft such that the said operative connection is established or disestablished by movement of the plunger of each auxiliary control device effected upon operation of the main control device.

FREDERICK JOHN TARRIS.